United States Patent
Lee et al.

(10) Patent No.: US 12,370,784 B2
(45) Date of Patent: Jul. 29, 2025

(54) RUBBER REINFORCING MATERIAL WITH REDUCED WEIGHT, METHOD OF PREPARING THE SAME, AND TIRE COMPRISING THE SAME

(71) Applicant: KOLON INDUSTRIES, INC., Seoul (KR)

(72) Inventors: Sang Woo Lee, Seoul (KR); Ok Hwa Jeon, Seoul (KR); Min Ho Lee, Seoul (KR); Sung Gyu Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 49 days.

(21) Appl. No.: 17/998,511

(22) PCT Filed: Aug. 13, 2021

(86) PCT No.: PCT/KR2021/010810
§ 371 (c)(1),
(2) Date: Nov. 11, 2022

(87) PCT Pub. No.: WO2022/065692
PCT Pub. Date: Mar. 31, 2022

(65) Prior Publication Data
US 2023/0278319 A1    Sep. 7, 2023

(30) Foreign Application Priority Data
Sep. 25, 2020  (KR) .......................... 10-2020-0125240

(51) Int. Cl.
B32B 25/10    (2006.01)
B32B 5/02     (2006.01)
(Continued)

(52) U.S. Cl.
CPC .............. *B32B 25/10* (2013.01); *B32B 5/024* (2013.01); *B32B 7/12* (2013.01); *B60C 9/14* (2013.01);
(Continued)

(58) Field of Classification Search
CPC ...................................... B32B 5/024
See application file for complete search history.

(56) References Cited

U.S. PATENT DOCUMENTS 4,196,763 A  *  4/1980  Imamura .................. D03D 1/00
                                                    152/565
5,240,772 A     8/1993  Henning
(Continued)

FOREIGN PATENT DOCUMENTS

CN    101652255 A    2/2010
CN    105983274 A    10/2016
(Continued)

OTHER PUBLICATIONS

International Search Report Dated Dec. 7, 2021.
The Office Action dated May 30, 2025, of the corresponding Chinese Patent Application.

*Primary Examiner* — Jenna L Johnson
(74) *Attorney, Agent, or Firm* — Harvest IP Law, LLP

(57) ABSTRACT

This invention relates to rubber reinforcing material with reduced weight, a method for preparing the same, and a tire including the same. According to this invention, there is provided a rubber reinforcing material that has a thin thickness and light weight, and yet has excellent durability. The reinforcing material not only reduces the weight of a tire, but also enables realization of improved rolling resistance.

9 Claims, 2 Drawing Sheets

(51) Int. Cl.
*B32B 7/12* (2006.01)
*B60C 9/14* (2006.01)
*B60C 9/22* (2006.01)
*C08J 5/04* (2006.01)
*C09J 161/12* (2006.01)

(52) U.S. Cl.
CPC .............. *B60C 9/22* (2013.01); *C08J 5/046* (2013.01); *C09J 161/12* (2013.01); *B32B 2250/02* (2013.01); *B60C 2009/2247* (2013.01); *C08J 2307/00* (2013.01); *C08J 2309/00* (2013.01)

(56) References Cited

U.S. PATENT DOCUMENTS

| | | | |
|---|---|---|---|
| 2004/0149382 A1 | 8/2004 | Giza | |
| 2017/0137976 A1† | 5/2017 | Youn | |
| 2020/0122508 A1* | 4/2020 | Kim | B60C 9/0042 |
| 2020/0269637 A1* | 8/2020 | Takemoto | B60C 9/1807 |

FOREIGN PATENT DOCUMENTS

| | | | |
|---|---|---|---|
| EP | 1400577 A1 | | 3/2004 |
| JP | S52-070167 A | | 6/1977 |
| JP | S54-070502 A | | 6/1979 |
| JP | H02-175909 A | | 7/1990 |
| JP | 03-167046 A | | 7/1991 |
| JP | H08-156516 A | | 6/1996 |
| JP | 1997-021060 A | † | 1/1997 |
| JP | H09-21060 A | | 1/1997 |
| JP | 1998-168700 A | † | 6/1998 |
| JP | H10168700 A | | 6/1998 |
| JP | 2003-049339 A | † | 2/2003 |
| JP | 2009-127144 A | | 6/2009 |
| JP | 2018-099776 A | | 6/2018 |
| JP | 2020-525344 A | | 8/2020 |
| KR | 1993-0010808 B1 | † | 7/1993 |
| KR | 930010808 B1 | | 11/1993 |
| KR | 10-0233301 B1 | † | 6/1997 |
| KR | 970027389 A | | 6/1997 |
| KR | 1998-0072904 A | † | 11/1998 |
| KR | 1999-0079672 A | † | 11/1999 |
| KR | 100462924 B1 | | 12/2004 |
| KR | 10-2011-0109117 A | | 10/2011 |
| KR | 2014-0023956 A | † | 2/2014 |
| KR | 101513374 B1 | | 4/2015 |
| KR | 2016-0000443 A | | 1/2016 |
| KR | 2018-0072332 A | † | 6/2018 |
| KR | 20180120932 A | | 11/2018 |
| KR | 2019-0143690 A | | 12/2019 |
| KR | 20200063545 A | | 6/2020 |
| TW | 201406572 A | | 2/2014 |
| WO | 2005-047025 A1 | | 5/2005 |
| WO | 2012-005751 A1 | | 1/2012 |
| WO | 2012-132975 A1 | | 10/2012 |
| WO | 2019-004666 A1 | | 1/2019 |

\* cited by examiner
† cited by third party

[Figure 1]
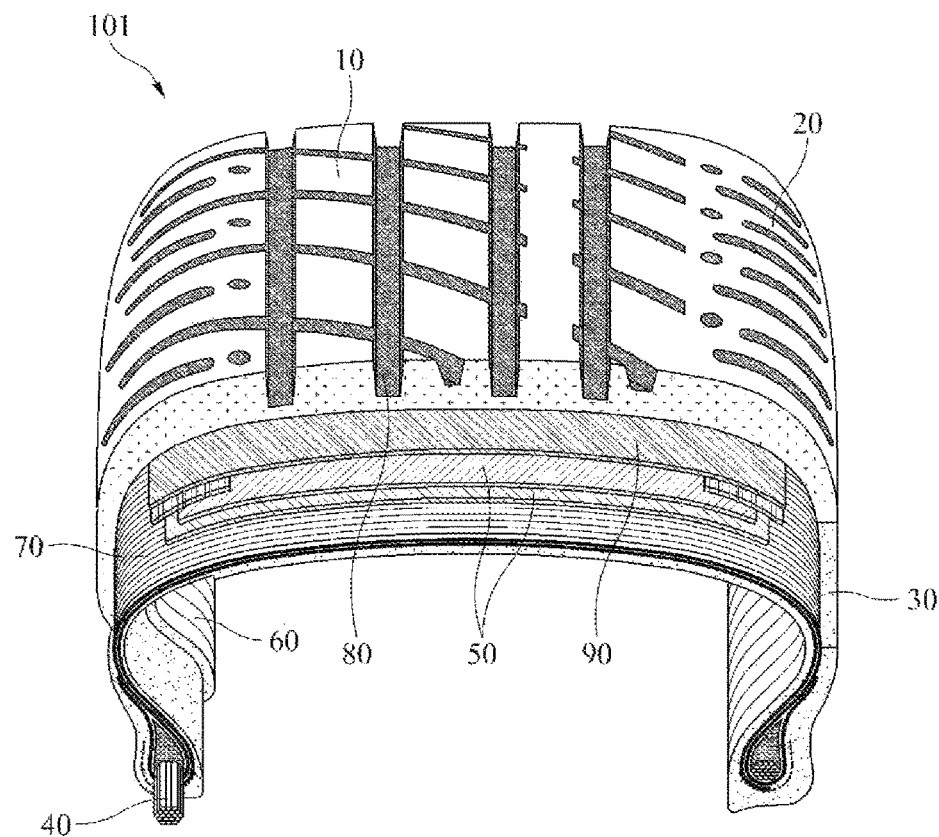
[Figure 2]
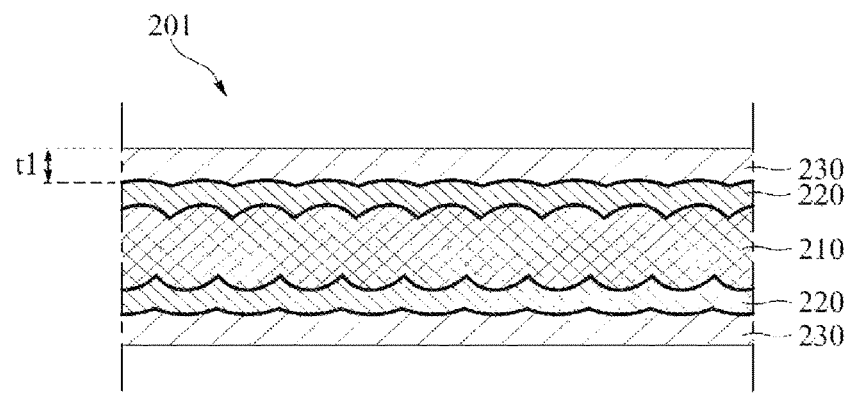

【Figure 3】
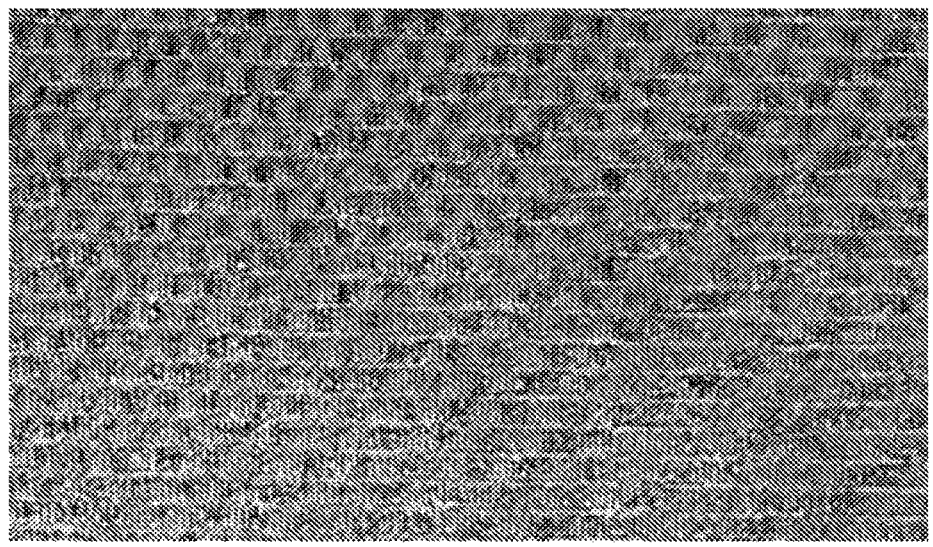

RUBBER REINFORCING MATERIAL WITH REDUCED WEIGHT, METHOD OF PREPARING THE SAME, AND TIRE COMPRISING THE SAME

CROSS-REFERENCE TO RELATED APPLICATIONS

This application is a National Stage of International Application No. PCT/KR2021/010810 filed Aug. 13, 2021, claiming priority based on Korean Patent Application No. 10-2020-0125240 filed Sep. 25, 2020.

TECHNICAL FIELD

This invention relates to rubber reinforcing material with reduced weight that is capable of reducing the weight of a tire, a method for preparing the same, and a tire including such rubber reinforcing material.

BACKGROUND OF ART

With the increase in the performance of automobiles and improvement in road conditions, a tire is required to maintain stability and durability during high speed running of an automobile. And, considering environmental problems, energy problems, fuel efficiency, and the like, a tire that has reduced weight and yet has excellent durability is required. As one of the solutions for satisfying such requirement, studies on tire cords used as rubber reinforcing material of a tire are being actively progressed.

Tire cords may be divided according to the part used and function. For example, a tire cord may be largely divided into a carcass generally supporting a tire, a belt withstanding load and preventing deformation according to high speed running, and a cap ply preventing deformation of the belt (see FIG. 1).

As the material used in the tire cord, nylon, rayon, aramid, polyester, and the like may be mentioned as examples.

In general, a tire cord is rolled together with rubber components for bonding with rubber. Namely, a rolling process is involved in the manufacture process of a tire. However, in case a rolling process is applied for bonding of a tire cord and rubber in the tire manufacturing process, a process cost may increase, and due to rolling, the density of a tire may increase more than necessary, and thus the weight of a tire may unnecessarily increase.

In the process of rolling rubber in a tire cord, solid rubber is generally used. However, it is difficult to make a product formed by rolling of solid rubber in the form of a thin film of 200 (m or less, particularly 5 μm to 30 μm, and in case such a product is used as rubber reinforcing material, the thickness and weight of a tire may increase.

Recently, tire manufacturing companies have been trying to decrease the thickness of a rubber layer for ultra light weight of a tire and light weight of a reinforcing material. Rolling resistance (R/R) is related to the weight of a tire, and has a large influence on fuel consumption and carbon dioxide discharge of automobiles. For example, as the rolling resistance (R/R) is larger, energy required during running of an automobile increases. And, resistance to automobile rotation, slope, and acceleration is related to the weight of an automobile. Thus, studies for reducing the weight of automobiles through the reduction of tire weight, and thereby reducing energy consumption, are being progressed.

DETAILED DESCRIPTION OF THE INVENTION

Technical Problem

It is an object of the invention to provide rubber reinforcing material that has a thin thickness, and yet has excellent durability.

It is another object of the invention to provide a method for preparing rubber reinforcing material that has a thin thickness, and yet has excellent durability.

It is still another object of the invention to provide a tire including the rubber reinforcing material.

Technical Solution

According to one embodiment of the invention, there is provided rubber reinforcing material including:
a fiber base;
an adhesive layer placed on the fiber base; and
a rubber compound layer placed on the adhesive layer,
wherein the fiber base is a fabric woven with warp yarns and weft yarns,
the warp yarn is a single-ply yarn having fineness of 420 denier to 800 denier, and is included in the fabric at the warp yarn density of 55/inch to 65/inch, and
the weft yarn has dry heat shrinkage of −1.0% to +3.0% according to the standard test method of ASTM D 885 (177° C., 2 minutes, load of 0.05 g/de).

According to another embodiment of the invention, there is provided a method for preparing the rubber reinforcing material, including steps of:
preparing a fiber base woven at the warp yarn density of 55/inch to 65/inch, using warp yarn, which is a single-ply yarn having fineness of 420 denier to 800 denier, and weft yarn having dry heat shrinkage of −1.0% to +3.0% according to the standard test method of ASTM D 885 (177° C., 2 minutes, load of 0.05 g/de);
forming an adhesive layer on the fiber base; and
applying a rubber coating solution on the adhesive layer and heat treating to form a rubber compound layer on the adhesive layer.

According to still another embodiment of the invention, there is provided a tire including the rubber reinforcing material.

Hereinafter, the rubber reinforcing material, a method for preparing the same, and a tire including the same according to the embodiments of the invention will be explained in detail.

Unless otherwise defined, all the technical terms and scientific terms used herein have the same meanings generally understood by a person having ordinary knowledge in the art. The terms used herein are only to effectively explain specific embodiments and are not intended to limit the invention.

A singular expression includes a plural expression thereof, unless it is expressly stated or obvious from the context that such is not intended.

As used herein, the term "comprise" is intended to designate the existence of practiced characteristics, numbers, steps, constructional elements, or combinations thereof, and it is not intended to preclude the possibility of existence or addition of one or more other characteristics, numbers, steps, constructional elements, or combinations thereof.

Although various modifications can be made to the invention and the present invention may have various forms, specific examples will be illustrated and explained in detail below. However, it should be understood that these are not intended to limit the invention to specific disclosures, and that the invention includes all modifications, equivalents, or replacements thereof without departing from the spirit and technical scope of the invention.

In case a location relationship of two parts is explained by 'on', 'above', 'below', 'under', 'beside', and the like, other parts may be located between the two parts unless the expression 'right' or 'directly' is used.

In case time sequence is explained by 'after', 'subsequently', 'next', 'before', and the like, discontinuous cases may be included unless the expression 'right' or 'directly' is used.

The term 'at least one' should be understood to include all combinations that can be presented from one or more related items.

I. Rubber Reinforcing Material

According to one embodiment of the invention, there is provided rubber reinforcing material including:
- a fiber base;
- an adhesive layer placed on the fiber base; and
- a rubber compound layer placed on the adhesive layer,
wherein the fiber base is a fabric woven with warp yarns and weft yarns,
the warp yarn is a single-ply yarn having fineness of 420 denier to 800 denier, and is included in the fabric at the warp yarn density of 55/inch to 65/inch, and
the weft yarn has dry heat shrinkage of −1.0% to +3.0% according to the standard test method of ASTM D 885 (177° C., 2 minutes, load of 0.05 g/de).

As the result of continuous studies by the inventors, it was confirmed that the rubber reinforcing material including the fiber base has a thin thickness, and yet exhibits excellent durability.

Further, since the rubber reinforcing material of the above embodiment has excellent adhesion strength to rubber, it can be strongly bonded with rubber without passing through a rolling process in the manufacturing process of a tire. Thus, the rubber reinforcing agent enables reduction of tire manufacturing cost, and prevents an unnecessary increase in the density and weight of a tire due to rolling.

Since the rubber reinforcing material has excellent adhesion strength to rubber, air pockets may decrease when manufacturing green tires, thereby reducing 16 a defect rate of tires.

Since the rubber reinforcing material has a thin thickness, it meets the requirement of decreasing the thickness of a rubber layer for ultralight weight of a tire. Moreover, the rubber reinforcing material may reduce rolling resistance, and enables improvement in the fuel efficiency of automobiles. Particularly, the rubber reinforcing material enables improvement in the fuel efficiency and running performance of electric vehicles.

FIG. 2 is a schematic cross-sectional view of the rubber reinforcing material 26 (201) according to one example of the invention.

The rubber reinforcing material (201) includes a fiber base (210), an adhesive layer (220) placed on the fiber base (210), and a rubber compound layer (230) placed on the adhesive layer (220).

According to an embodiment of the invention, the fiber base is a fabric woven with warp yarns and weft yarns.

In the fiber base, the warp yarn and the weft yarn may respectively include one or more materials selected from the group consisting of nylon, rayon, aramid, polyester, and cotton.

Preferably, the warp yarn may include one or more materials selected from the group consisting of nylon, rayon, aramid, and polyester. Further preferably, the weft yarn may include one or more materials selected from the group consisting of nylon, rayon, aramid, polyester, and cotton.

Particularly, the fiber base (210) has high density in a warp yarn direction.

Specifically, the warp yarn is a single-ply yarn having fineness of 420 denier to 800 denier, and is included in the fabric at the warp yarn density of 55/inch to 65/inch.

It is preferable that the warp yarn density of the fiber base is 55/inch or more, so that the rubber reinforcing material (201) may have a thin thickness, and yet exhibit excellent durability, If the warp yarn density is too high, it may be difficult to uniformly arrange warp yarns. And, due to overlap of dislocated warp yarns, wrinkles may be generated on the fiber base, and due to such wrinkles, the properties of the fiber base may become non-uniform. Thus, it is preferable that the warp yarn density of the fiber base is 65/inch or less.

The warp yarn is a single-ply yarn, and the fineness may be determined considering the warp yarn density. However, in order to secure the durability of the fiber base, it is preferable that the fineness of the warp yarn is 420 denier or more.

It is preferable that the fiber base has a density between warp yarns of 65% or more.

The density between warp yarns denotes an area occupied by warp yarns per inch, and specifically, it may be represented by {(thickness of one strand of warp yarn (inch) *number of warp yarns per inch (n))/inch}*100 (%).

Specifically, the density between warp yarns may be 65% or more, or 75% or more, or 90% or more. In case the density between warp yarns is 65% or more, the effects desired in this invention may be sufficiently exhibited.

The warp yarn may be twisted. The degree of twist of the warp yarn may be 0 to 250 TPM (twists per meter). If the warp yarn is twisted, a gathering property and fatigue resistance of the fiber base may be improved.

As the fiber base (210) includes highly densified warp yarns, it includes weft yarns enabling the warp yarns to be uniformly arranged.

Particularly, it is preferable that the weft yarn has dry heat shrinkage of −1.0% to +3.0% according to the standard test method of ASTM D 885 (177° C., 2 minutes, load of 0.05 g/de).

Herein, in case the dry heat shrinkage value is (+), it means shrinkage behavior, and in case it is (−), it means relaxation behavior.

During the manufacturing process of the rubber reinforcing material, predetermined heat is applied to the fiber base. Herein, in the fiber base, shrinkage of weft yarns is generated due to tension in a warp yarn direction and heat. However, since the fiber base includes highly densified warp yarns, due to overlap of dislocated warp yarns, wrinkles may be generated on the fiber base. Such wrinkles inhibit the correct formation of an adhesive layer (220) and a rubber compound layer (230) sequentially placed on the fiber base (210).

According to the embodiment of the invention, since the weft yarn included in the fiber base (210) has dry heat shrinkage of +0.5% according to the standard test method of ASTM D 885 (177° C., 2 minutes, load of 0.05 g/de), overlap of the warp yarns may be effectively inhibited.

The measurement of dry heat shrinkage of the weft yarn is conducted by applying a load of 0.05 g/de to a weft yarn specimen (length of 60 cm), applying heat of 177° C. for 2 minutes, and then measuring change in the length of the weft yarn specimen, according to the standard test method of ASTM D 885.

Preferably, the weft yarn may have dry heat shrinkage according to the standard test method of ASTM D 885 (177° C., 2 minutes, load of 0.05 g/de), of −1.0% to +3.0%, or −1.0% to +2.0%, or −0.5% to +2.0%, or −0.5% to +1.5%, or −0.5% to +1.0%, or −0.50% to +0.50%, or −0.40% to +0.50%, or −0.40% to +0.40%, or −0.30% to +0.40%, or −0.30% to +0.30%, or −0.20% to +0.30%.

According to the embodiment of the invention, the weft yarn is a single-ply-yarn having fineness of 420 denier to 800 denier.

The weft yarn may be included in the fabric at the weft yarn density of 0.05/mm to 5/mm, or 0.05/mm to 4.5/mm, or 0.05/mm to 4/mm, or 0.05/mm to 3.5/mm, or 0.05/mm to 3/mm, or 0.05/mm to 2.5/mm.

The fiber base (201) may have a thickness of 100 μm to 600 μm, or 200 μm to 500 μm, or 200 μm to 400 μm. The fiber base may have excellent durability within the above-described thickness range.

The fiber base may have dry heat shrinkage −1.0% to +3.0%, according to the standard test method of ASTM D 885 (specimen size: weft yarn direction length of 60 cm×width 1 cm, 177° C., 2 minutes, load of 0.05 g/de based on weft yarn). Herein, in case the dry heat shrinkage value is (+), it means shrinkage behavior, and in case the dry heat shrinkage value is (−), it means relaxation behavior.

The measurement of dry heat shrinkage of the fiber base is conducted by applying a load of 0.05 g/de on the basis of the fineness of the weft yarn to a fiber base specimen (weft yarn direction length 60 cm×width 1 cm), applying heat of 177° C. for 2 minutes, and then measuring changes in the length and width of the fiber base specimen, according to the standard test method of ASTM D 885.

Preferably, the fiber base may have dry heat shrinkage of −1.0% to +3.0%, or −1.0% to +2.0%, or −0.5% to +2.0%, or −0.5% to +1.5%, or −0.5% to +1.0%, or −0.50% to +0.50%, or −0.40% to +0.50%, or −0.40% to +0.40%, or −0.30% to +0.40%, or −0.30% to +0.30%, according to the standard test method of ASTM D (specimen size: weft yarn direction length of 60 cm×width 1 cm, 177° C., 2 minutes, 0.05 g/de load on the basis of weft yarn).

Meanwhile, the rubber reinforcing material (201) includes an adhesive layer (220) placed on the fiber base (210).

The adhesive layer includes resorcinol-formaldehyde-latex (RFL).

For example, the adhesive layer (220) may be formed by an adhesion coating solution including resorcinol-formaldehyde-latex (RFL) and a solvent.

The resorcinol-formaldehyde-latex functions as an adhesive component. The resorcinol-formaldehyde-latex improves affinity and adhesion strength particularly between the fiber base (210) and rubber components. Thereby, the adhesive layer (220) improves internal adhesion strength between the fiber base (210) and the rubber compound layer (230), and improves external adhesion strength between the rubber reinforcing material (201) and rubber (for example, a tread and the like).

Thereby, the fiber base (210) and rubber compound layer (230) may be stably attached to each other without being separated, thereby reducing a defect rate in the manufacturing process of a tire (101).

Meanwhile, the rubber reinforcing material (201) includes a rubber compound layer (230) placed on the adhesive layer (220).

The rubber compound layer (230) may include one or more elastic polymers selected from the group consisting of natural rubber and synthetic rubber.

The rubber compound layer (230) may be formed by applying a liquid rubber coating solution including the elastic polymer on the adhesive layer (220). Thereby, the rubber reinforcing material (201) may have a rubber compound layer (230) with a thin thickness, which is difficult to achieve through the rolling process using solid rubber. As the thickness of the rubber compound layer (230) becomes thin, it may contribute to weight reduction of the rubber reinforcing material (201) including the same and a tire including the rubber reinforcing material (201).

Specifically, the rubber compound layer (230) may be formed from a rubber coating solution including an elastic polymer composition and a solvent.

The elastic polymer composition may include elastic polymer and additives. The elastic polymer may be one or more rubbers selected from the group consisting of natural rubber and synthetic rubber. For example, the elastic polymer may be one or more rubbers selected from the group consisting of natural rubber (NR), styrene butadiene rubber (SBR), butadiene rubber (BR), chloroprene rubber (CR), isobutylene rubber (IBR), isoprene rubber (IR), nitrile rubber (NBR), butyl rubber, and neoprene rubber.

As the additives that may be included in the elastic polymer composition, carbon black, para oil, zinc oxide, stearic acid, anti-aging agents, sulfur, vulcanization accelerators, activators, pressure sensitive adhesives, adhesives, and the like May be mentioned.

The kind of the solvent included in the rubber coating solution is not specifically limited as long as it can dissolve the elastic polymer. For example, the solvent may include at least one selected from the group consisting of toluene, naphtha, methanol, xylene, and tetrahydrofuran.

The rubber coating solution may include 10 wt % to 40 wt % of the elastic polymer composition and 60 wt % to 90 wt % of the solvent, based on the total weight of the rubber coating solution.

If the concentration of the elastic polymer composition in the rubber coating solution is too low, the thickness of the rubber compound layer may become too thin, and required pressure sensitive adhesion strength and adhesion strength may not be exhibited. Thus, it is preferable that the rubber coating solution includes 10 wt % or more of the elastic polymer composition.

However, if the concentration of the elastic polymer composition in the rubber coating solution is too high, due to a viscosity increase, stirrability of the rubber coating solution may be deteriorated and dispersibility of the components May be lowered, and thus coatability may be deteriorated and coating thickness May become non-uniform. Thus, it is preferable that the rubber coating solution includes 40 wt % or less of the elastic polymer composition.

The rubber compound layer (230) may have a thickness (t1) of 5 μm to 200 μm, or 5 μm to 150 μm, or 5 μm to 100 μm, or 5 μm to 50 μm.

As shown in FIG. 2, the thickness of the rubber compound layer (230) is measured as the longest distance from one side of the rubber compound layer (230) adjoining to the adhesive layer (220) to another side of the rubber compound layer (230) positioned on the opposite side of the adhesive layer (220).

In the existing rubber reinforcing material, a rubber base is rolled on a fiber base to form a rubber layer, and thus the rubber layer generally has a thickness of 1 mm or more, or at least 0.8 mm or more.

To the contrary, since the rubber compound layer (230) is formed by the rubber coating solution, it may have a thin thickness of 200 μm or less. Thus, the 9 entire thickness of the rubber reinforcing material (201) may become thin, and moreover, the thickness of a tire (101) including the rubber reinforcing material (201) may become thin.

If the thickness of the rubber compound layer (230) is too thin, the rubber compound layer (230) may not have sufficient pressure sensitive adhesion strength and adhesion strength, and thus a defect rate may increase when manufacturing tires, and durability of a tire may be deteriorated. Thus, it is preferable that the rubber compound layer (230) has a thickness of 5 μm or more.

However, if the thickness of the rubber compound layer (230) is too thick, it may not be appropriate for the object of the invention to provide a rubber reinforcing material (201) with a thin thickness. Particularly, if the thickness of the rubber compound layer (230) is too thick, bubbles may be formed in the rubber compound layer (230) during the evaporation process of a solvent, and thus it may be difficult for the rubber reinforcing material (201) to have a uniform thickness. Further, air pockets may be generated in a tire applied with the same, and thus tire quality May be deteriorated and a defect rate may increase. And, a coating operation should be conducted several times so as to form the rubber compound layer (230) to be thick, and thus process efficiency may be deteriorated. Thus, it is preferable that the rubber compound layer (230) has a thickness (t1) of 200 μm or less.

Meanwhile, the rubber reinforcing material (201) according to the above embodiment may have dry heat shrinkage of −4% to −2% according to the standard test method of ASTM D 885 (specimen size: weft yarn direction length 60 cm×width 1 cm, 150° C., 2 minutes, load of 10 g).

The measurement of dry heat shrinkage of the rubber reinforcing material is conducted by applying a load of 10 g to a rubber reinforcing material specimen (weft yarn direction length 60 cm×width 1 cm), applying heat of 150° C. for 2 minutes, and then measuring changes in the length and width of the rubber reinforcing material specimen, according to the standard test method of ASTM D 885.

The rubber reinforcing material (201) according to the above embodiment may exhibit a maximum load of 1.0 kgf to 1.2 kgf, or 1.1 kgf to 1.2 kgf, in the tensile test of a specimen (size: weft yarn direction length 25 cm×width 1 cm) under 150° C.

The rubber reinforcing material (201) may exhibit a maximum load of 1.0 kgf to 1.2 kgf, or 1.0 kgf to 1.1 kgf, in the tensile test of a specimen (size: weft yarn direction length 25 cm×width 1 cm) under 160° C.

The rubber reinforcing material (201) may exhibit a maximum load of 0.8 kgf to 1.1 kgf, or 0.9 kgf to 1.1 kgf, in the tensile test of a specimen (size: weft yarn direction length 25 cm×width 1 cm) under 177° C.

And, the rubber reinforcing material (201) according to the above embodiment may have tensile strain of 11.0% to 13.0%, or 11.0% to 12.0%, in the tensile test of a specimen (size: weft yarn direction length 25 cm×width 1 cm) under 150° C.

The rubber reinforcing material (201) may have tensile strain of 13.0% to 15.0%, or 14.0% to 15.0%, in the tensile test of a specimen (size: weft yarn direction length 25 cm×width 1 cm) under 160° C.

The rubber reinforcing material (201) may have tensile strain of 13.0% to 15.0%, or 14.0% to 15.0%, in the tensile test of a specimen (size: weft yarn direction length 25 cm×width 1 cm) under 177° C.

The tensile test may be conducted using a half chamber considering the construction of the rubber reinforcing material. In the case of a common high temperature chamber, the whole specimen is put in the chamber, heated, and left at a high temperature for a certain time, and then tensile properties are evaluated. However, the rubber reinforcing material has a rubber compound layer (230) formed outside, and thus, in case a common high temperature chamber is used, slip of a grip part is generated due to high temperature, and thus it is difficult to measure the properties. Thus, it is preferable that the tensile test is conducted using the half chamber capable of heating only the middle part of the rubber reinforcing material specimen.

The rubber reinforcing material (201) according to the above embodiment may be applied for at least one of a cap ply (90), a belt (50), and a carcass (70) of a tire.

II. Preparation Method of Rubber Reinforcing Material

According to another embodiment of the invention, there is provided a method for preparing the rubber reinforcing material, including steps of:

preparing a fiber base woven at the warp yarn density of 55/inch to 65/inch, using warp yarn, which is a single-ply yarn having fineness of 420 denier to 800 denier, and weft yarn having dry heat shrinkage of −1.0% to +3.0% according to the standard test method of ASTM D 885 (177° C., 2 minutes, load of 0.05 g/de);

forming an adhesive layer on the fiber base; and applying a rubber coating solution on the adhesive layer and heat treating to form a rubber compound layer on the adhesive layer.

Using warp yarn, which is single-ply yarn having fineness of 420 denier to 800 denier, and weft yarn having dry heat shrinkage of −1.0% to +3.0% according to the standard test method of ASTM D 885 (177° C., 2 minutes, load of 0.05 g/de), a fiber base (210) woven at the warp yarn density of 55/inch to 65/inch is prepared.

To the details of the fiber base (210), explanations in the "1. rubber reinforcing material" are applied.

A step of forming an adhesive layer (220) on the fiber base (210) is conducted.

The adhesive layer (220) may be formed by an adhesive coating solution including resorcinol-formaldehyde-latex (RFL) and a solvent.

For example, the adhesive coating solution may be applied on the fiber base (210) by immersing the fiber base (210) in the adhesive coating solution. Alternatively, the immersion process may be achieved by passing the fiber base (210) through the adhesive coating solution. Such immersion may be conducted in an immersion device in which tension, immersion time, and temperature can be controlled.

In addition, the adhesive coating solution may be applied on the fiber base (210) by coating using a blade or coater, or by spraying using a spray.

The step of forming the adhesive layer (220) may further include applying the adhesive coating solution on the fiber base (210), and heat treating at 130° C. to 250° C. for 80 to 120 seconds. The heat treatment may be conducted in a common apparatus for heat treatment. By the heat treatment, resorcinol-formaldehyde-latex (RFL) may be cured or fixed to form an adhesive layer (220). By such heat treatment, the adhesive layer (220) can be formed more stably.

Subsequently, a step of applying the rubber coating solution on the adhesive layer (220) and heat treating to form a rubber compound layer (230) on the adhesive layer (220), is conducted.

The rubber compound layer (230) may be formed from a rubber coating solution including an elastic polymer composition and a solvent.

The elastic polymer composition may include an elastic polymer and additives.

The elastic polymer may be one or more rubber selected from the group consisting of natural rubber and synthetic rubber. For example, the elastic polymer may be one or more rubbers selected from the group consisting of natural rubber (NR), styrene butadiene rubber (SBR), butadiene rubber (BR), chloroprene rubber (CR), isobutylene rubber (IBR), isoprene rubber (IR), nitrile rubber (NBR), butyl rubber, and neoprene rubber.

As the additives that may be included in the elastic polymer composition, carbon black, para oil, zinc oxide, stearic acid, anti-aging agents, sulfur, vulcanization accelerators, activators, pressure sensitive adhesives, adhesives, and the like May be mentioned.

The kind of the solvent included in the rubber coating solution is not specifically limited as long as it can dissolve the elastic polymer. For example, the solvent may include at least one selected from the group consisting of toluene, naphtha, methanol, xylene, and tetrahydrofuran.

The rubber coating solution may include 10 wt % to 40 wt % of the elastic polymer composition and 60 wt % to 90 wt % of the solvent, based on the total weight of the rubber coating solution.

If the concentration of the elastic polymer composition in the rubber coating solution is too low, the thickness of the rubber compound layer may become too thin, and required pressure sensitive adhesion strength and adhesion strength may not be exhibited. Thus, it is preferable that the rubber coating solution includes 10 wt % or more of the elastic polymer composition.

However, if the concentration of the elastic polymer composition in the rubber coating solution is too high, due to viscosity increase, stirrability of the rubber coating solution may be deteriorated and dispersibility of the components may be lowered, and thus coatability may be deteriorated and the coating thickness May become non-uniform. Thus, it is preferable that the rubber coating solution includes 40 wt % or less of the elastic polymer composition.

A method of applying the rubber coating solution on the adhesive layer (220) is not specifically limited, and known coating methods may be applied.

For example, in order to form a rubber compound layer (230), a fiber base on which an adhesive layer (220) is formed may be immersed in the rubber coating solution. By immersion, the rubber coating solution may be applied on the adhesive layer (220).

As a coating method, gravure coating, microgravure coating, comma coating, and the like may be applied. For example, by comma coating using a comma coater, the rubber coating solution may be applied on the adhesive layer (220). Herein, the coating may be conducted at a temperature capable of evaporating solvents, for example, at a temperature of 65° C. to 100° C.

After applying the rubber coating solution on the adhesive layer (220), heat treatment is further conducted. The heat treatment may be conducted in a common apparatus for heat treatment. For the heat treatment, heat may be applied at a temperature of 50° C. to 160° C. for 30 to 150 seconds.

The amount of the rubber coating solution applied per unit area may be 75 g/m$^2$ to 300 g/m$^2$, or 100 g/m$^2$ to 200 g/m$^2$. By controlling the amount of the rubber coating solution applied per unit area of the adhesive layer (220) within the above range, a rubber reinforcing material (101) that has a thin thickness, and yet has an excellent adhesion property and durability, can be prepared.

The rubber compound layer (230) may have a thickness (t1) of 5 μm to 200 μm, or 5 μm to 150 μm, or 5 μm to 100 μm, or 5 μm to 50 μmm.

Meanwhile, after formation of the rubber compound layer (230), a slitting step may be optionally conducted. The slitting step is a step of cutting the rubber reinforcing material (201) prepared in the form of a plate, as necessary or according to the purpose of use. The slitting may be conducted using a common cutter knife or heating knife.

The rubber reinforcing material (201) prepared by the above method may be wound in a winder.

III. Tire

According to still another embodiment of the invention, there is provided a tire including the above-explained rubber reinforcing material.

FIG. 1 is a partial cutting view of the tire (101) according to one example of the invention.

Referring to FIG. 1, a tire (101) includes a tread (10), a shoulder (20), a side wall (30), a bead (40), a belt (50), an inner liner (60), a carcass (70), and a cap ply (90).

The tread (10) is a part directly contacting the road surface. The tread (10) is a strong rubber layer attached to the outside of the cap ply (90), and consists of rubber having excellent abrasion resistance. The tread (10) performs a direct function for delivering driving force and braking force of an automobile to the ground. In the tread (10) region, grooves (80) are formed.

The shoulder (20) is an edge part, and is connected with the side wall (30). The shoulder (20) is one of the weakest parts of a tire in addition to the side wall (30).

The side wall (30) is a side part of a tire (101) connecting the tread (10) and the bead (40), and it protects the carcass (70) and provides side stability to a tire.

The bead (40) is a region in which steel wire winding the end part of the carcass (70) is included, wherein the steel wire is coated with rubber and covers the cord. The bead (40) functions for fitting and fixing a tire (101) to a wheel rim.

The belt (50) is a coat layer positioned between the tread (10) and carcass (70). The belt (50) functions for preventing damage of internal constructional elements such as the carcass (70) by external impact or external conditions, and it maintains the shape of the tread (10) to be flat, thereby maintaining contact of a tire (101) and a road surface in the best condition. The belt (50) may include the rubber reinforcing material (201) according to another embodiment of the invention (See FIG. 2).

The inner liner (60) is used instead of a tube in a tubeless tire, and is made of a special rubber with little or no air permeability. The inner liner (60) prevents leakage of air filled in a tire (101).

The carcass (70) is formed of overlapping sheets of cords made of high strength synthetic fiber, and is an important part for forming the backbone of a tire (101). The carcass (70) functions for withstanding the load and impact applied to a tire (101) and maintaining air pressure. The carcass (70) may include the rubber reinforcing material (201) according to another embodiment of the invention.

The groove (80) refers to big void in the tread region. The groove (80) functions for increasing drainability while running on a wet road surface and improving grip force.

The cap ply (90) is a protection layer under the tread (10), and protects other constructional elements inside. The cap ply (90) is necessarily applied for high speed running vehicles. Particularly, as the running speed of a vehicle increases, the belt part of a tire is deformed to lower ride comfort, and thus the importance of the cap ply (90) preventing the deformation of the belt part is increasing. The cap ply (90) may include the rubber reinforcing material (201) according to another embodiment of the invention.

The tire (101) according to one embodiment of the invention includes the rubber reinforcing material (201). The rubber reinforcing material (201) may be applied for at least one of the cap ply (90), the belt (50), and the carcass (70).

Advantageous Effects

According to his invention, there is provided a rubber reinforcing material that has a thin thickness and light weight, and yet has excellent durability. The reinforcing material not only reduces the weight of a tire, but also enables realization of improved rolling resistance.

DESCRIPTION OF DRAWINGS

FIG. 1 is a partial cutting view of the tire according to one example of the invention.

FIG. 2 is a schematic cross-sectional view of the rubber reinforcing material according to one example of the invention.

FIG. 3 shows the images of the exterior of the fiber bases according to (a) Example 1 and (b) Comparative Example 1, taken by a camera, after measuring dry heat shrinkage.

<Reference numerals>

| | |
|---|---|
| 10: tread | 20: shoulder |
| 30: side wall | 40: bead |
| 50: belt | 60: inner liner |
| 70: carcass | 80: groove |
| 90: cap ply | 101: tire |
| 201: rubber reinforcing material | 210: fiber base |
| 220: adhesive layer | 230: rubber compound layer |

DETAILED DESCRIPTION OF THE EMBODIMENTS

Hereinafter, preferable examples are presented for better understanding of the invention. However, these examples are presented only as illustrations of the invention, and the invention is not limited thereby.

Example 1

As warp yarn, single-ply yarn (twist of 200 TPM) with fineness of 630 denier, made of nylon, was prepared. As weft yarn, single-ply yarn (twist of 200 TPM) with fineness of 260 denier, made of cotton, was prepared. The weft yarn had dry heat shrinkage of −0.16% according to the standard test method (177° C., 2 minutes, 0.05 g/de load) of ASTM D 885 (see experimental examples below).

Using the warp yarn and weft yarn, a fiber base (210) with a thickness of 45 µm having warp yarn density of 55/inch (density between warp yarns of 90%) and weft yarn density of 2.5/mm was woven.

The fiber base (210) was immersed in an adhesive coating solution including 15 wt % of resorcinol-formaldehyde-latex (RFL) and 85 wt % of a solvent (water, $H_2O$), and then heat treated at 150° C. for 100 seconds to form an adhesive layer (220).

Subsequently, using a comma coater, a rubber coating layer was applied on the adhesive layer (220) in the amount per unit area of 120~130 g/m$^2$, and then solvents were evaporated at 70° C. to prepare a rubber reinforcing material (201) including a rubber compound layer (230) with a thickness (t1) of 10 µm.

Herein, as the rubber coating solution for the formation of the rubber compound layer (230), a solution in which an elastic polymer composition was dispersed in a mixed solvent of toluene and tetrahydrofuran mixed at the weight ratio of 20:80, at a concentration of 12 wt %, was used.

As the elastic polymer composition, a mixture of 100 parts by weight of styrene butadiene rubber (SBR), 60 parts by weight of carbon black, 20 parts by weight of para oil, 3 parts by weight of zinc oxide, 2 parts by weight of stearic acid, 2 parts by weight of an anti-aging agent (RUBBER ANTIOXIDANTS, BHT), 2 parts by weight of sulfur, and 1 part by weight of vulcanization accelerators (ZnBX) was used.

The rubber reinforcing material (201) was cut to a width of 10 mm, thus preparing a rubber reinforcing material for a cap ply (90). For cutting, a cutter knife was used.

The cut rubber reinforcing material was applied for the manufacture of a tire of a 205/55R16 standard. For the manufacture of the tire, a body ply including 1300De/2ply HMLS tire cord and steel cord belt were used.

Specifically, rubber for the body ply was laminated on inner liner rubber, bead wire and a belt part were laminated, and then the above-prepared rubber reinforcing material was introduced, and rubber layers for the formation of a tread part, a shoulder part, and a side wall part were sequentially formed, thus manufacturing a green tire. The green tire was put in a vulcanization mold and vulcanized at 170° C. for 15 minutes, thus manufacturing a tire.

Example 2

A rubber reinforcing material and a tire including the same were prepared by the same method as Example 1, except that single-ply yarn (twist of 200 TPM) with fineness of 260 denier, made of rayon, was used as weft yarn. The weft yarn had dry heat shrinkage of +0.27% according to the standard test method (177° C., 2 minutes, 0.05 g/de load) of ASTM D 885 (see experimental examples below).

Comparative Example 1

A rubber reinforcing material and a tire including the same were prepared by the same method as Example 1, except that a single-ply yarn (twist of 200 TPM) with fineness of 630 denier, made of nylon, was used as weft yarn. The weft yarn had dry heat shrinkage of +5.06% according to the standard test method (177° C., 2 minutes, 0.05 g/de load) of ASTM D 885 (see experimental examples below).

Comparative Example 2

A rubber reinforcing material and a tire including the same were prepared by the same method as Example 1, except that cotton covered nylon yarn (twist of 200 TPM) with fineness of 160 denier was used as weft yarn. The weft yarn had dry heat shrinkage of +1.04% according to the standard test method (177° C., 2 minutes, 0.05 g/de load) of ASTM D 885 (see experimental examples below).

Experimental Example (1) Measurement of Thickness

The thicknesses of the fiber base and the rubber compound layer in each rubber reinforcing material according to the examples and comparative examples were measured using vernier calipers of Mitutoyo Corporation.

(2) Measurement of Dry Heat Shrinkage of Weft Yarn

According to the standard test method of ASTM D 885, a load of 0.05 g/de was applied to each weft yarn specimen (length 60 cm) used in the examples and comparative examples, heat of 177° C. was applied for 2 minutes, and then a change in the length of the weft yarn specimen was measured. It was measured a total of 5 times, and the average rate of change (%) in the length of the weft yarn specimen is shown in the following Table 1. In case the dry heat shrinkage value is (+), it means shrinkage behavior, and in case the value is (−), it means relaxation behavior.

(3) Measurement of Dry Heat Shrinkage of Fiber Base

According to the standard test method of ASTM D 885, a load of 0.05 g/de, on the basis of fineness of weft yarn, was applied to each fiber base specimen according to the examples and comparative examples (weft yarn direction length 60 cm×width 1 cm) in the weft yarn direction, heat of 177° C. was applied for 2 minutes, and then changes in the length and width of the fiber base specimen were measured. It was measured a total of 5 times, and the average rate of change (%) in the area of the fiber base specimen is shown in the following Table 1. In case the dry heat shrinkage value is (+), it means shrinkage behavior, and in case the value is (−), it means relaxation behavior.

TABLE 1

| Dry heat shrinkage (%) | Example 1 | Example 2 | Comparative Example 1 | Comparative Example 2 |
|---|---|---|---|---|
| Weft yarn | −0.16 | +0.27 | +5.06 | −1.04 |
| Fiber base | −0.25 | +0.21 | +5.02 | −1.08 |

(4) Measurement of Dry Heat Shrinkage of Rubber Reinforcing Material

According to the standard test method of ASTM D 885, a load (5 g or 10 g) was applied to each rubber reinforcing material specimen according to the examples and comparative examples (weft yarn direction length 60 cm×width 1 cm) in the weft yarn direction, heat (25° C., 150° C., 160° C., or 177° C.) was applied for 2 minutes, and then changes in the length and width of the rubber reinforcing material specimen were measured. It was measured a total of 5 times, and the average rate of change (%) in the area of the rubber reinforcing material specimen is shown in the following Table 2. In case the dry heat shrinkage value is (+), it means shrinkage behavior, and in case the value is (−), it means relaxation behavior.

TABLE 2

| Dry heat shrinkage | Example 1 | | Comparative Example 1 | |
|---|---|---|---|---|
| (%) | load 5 g | load 10 g | load 5 g | load 10 g |
| @ 25° C. | −0.21 | −0.35 | −0.01 | −0.18 |
| @ 150° C. | −1.03 | −2.94 | −0.08 | −0.19 |
| @ 160° C. | −1.05 | −2.37 | −0.07 | −0.30 |
| @ 177° C. | −2.32 | −1.69 | −0.02 | +0.03 |

(5) Exterior of Fiber Base

After measuring dry heat shrinkage of the fiber base according to Experimental Example 3, the exterior of each fiber base according to Example 1 and Comparative Example 1 was photographed by a camera. The photographed image is shown in FIG. 3 ((a): Example 1, (b) Comparative Example 1).

Referring to FIG. 3, it is confirmed that in the fiber base of Comparative Example 1, wrinkles were generated due to the overlap of dislocated warp yarns. To the contrary, it is confirmed that in the fiber base of Example 1, the arrangement of warp yarns was uniform and wrinkles were not generated.

(6) Measurement of Tensile Properties of Rubber Reinforcing Material

Each rubber reinforcing material specimen according to Example 1 and Comparative Example 1 (size: weft yarn direction length 25 cm×width 1 cm) was mounted in a half chamber to measure tensile properties.

The specimen was fitted in an upper grip and a lower grip of the half chamber (distance between grips: 20 cm) in the direction perpendicular to the horizontal plane. To the specimen part (heated length 12 cm) positioned between the grips, heat (25° C., 150° C., 160° C., or 177° C.) was applied for 2 minutes, and then the specimen was pulled at a speed of 300 mm/min. Maximum load (kgf) and tensile strain when the specimen was broken were measured. They were measured a total of 5 times, and the average values are shown in the following Table 3.

TABLE 3

| Tensile properties | Example 1 | | Comparative Example 1 | |
|---|---|---|---|---|
| | Maximum load (kgf) | Tensile strain (%) | Maximum load (kgf) | Tensile strain (%) |
| @ 25° C. | 1.96 | 19.12 | 17.33 | 34.72 |
| @ 150° C. | 1.13 | 11.60 | 11.90 | 32.08 |
| @ 160° C. | 1.06 | 14.80 | 11.40 | 33.50 |
| @ 177° C. | 0.99 | 14.80 | 11.07 | 33.95 |

Referring to Table 3, the rubber reinforcing material of Comparative Example 1 exhibited high tensile strain compared to the rubber reinforcing material of Example 1. This means that it is difficult to prepare a uniform product with the rubber reinforcing material of Comparative Example 1, due to overlap of fabrics in the preparation process. Thus, it can be expected that the rubber reinforcing material of Comparative Example 1 has relatively poor preparation uniformity.

(7) Evaluation of Tire Properties

A 205/60 R16 standard tire applying a tire cord prepared by a rolling process (using two-ply yarn made of nylon with fineness of 840 denier as warp yarn, warp yarn density of 25/inch) was prepared as a reference example.

For each tire of the reference example and Example 1, the following properties were measured. The property values of the tire of Example 1 are values converted based on the property values (100%) of the tire of the reference example.

material weight: weights of the rubber reinforcing material of Example 1 and the tire cord of the reference example tire weight: weights of tires of Example 1 and the reference example high speed running performance: measured according to the standard test method of US FMVSS 139H durability I: measured according to the standard test method of US FMVSS 139E durability II: measured according to the standard test method of Europe ECE-R119 rolling resistance (RRc): measured according to the standard test method of ISO 28580

TABLE 4

| Tire | Example 1 (index) | Reference example (index) |
|---|---|---|
| Material weight | 30 | 100 |
| Tire weight | 98 | 100 |
| High speed running performance | 104 | 100 |
| Durability I | 106 | 100 |
| Durability II | 105 | 100 |
| Rolling resistance (RRc) | 102 | 100 |

Referring to Table 4, it was confirmed that since the tire of Example 1 includes the rubber reinforcing material according to the embodiment of the invention, it has reduced weighted, and yet exhibits excellent high speed running performance, durability, and rolling resistance.

The invention claimed is:

1. A rubber reinforcing material comprising:
a fiber base;
an adhesive layer placed on the fiber base; and
a rubber compound layer placed on the adhesive layer,
wherein the fiber base is a fabric woven with warp yarns and weft yarns,
the warp yarn is a single-ply yarn with fineness of 420 denier to 800 denier, and is included in the fabric at a warp yarn density of 55/inch to 65/inch, and
the weft yarn has dry heat shrinkage of −0.50% to +0.50% according to the standard test method of ASTM D 885 (177° C., 2 minutes, load of 0.05 g/de),
wherein the weft yarn is a single-ply yarn with fineness of 420 denier to 800 denier, and is included in the fabric at the weft yarn density of 0.05/mm to 5/mm,
wherein the rubber reinforcing material has a maximum load of 1.0 kgf to 1.2 kgf and tensile strain of 11% to 13% in the tensile test under 150° C. for a specimen sized 25 cm of weft yarn direction length and 1 cm wide.

2. The rubber reinforcing material according to claim 1, wherein the warp yarn and the weft yarn respectively comprise one or more materials selected from the group consisting of nylon, rayon, aramid, polyester, and cotton.

3. The rubber reinforcing material according to claim 1, wherein the fiber base has a thickness of 100 μm to 600 μm.

4. The rubber reinforcing material according to claim 1, wherein the fiber base has dry heat shrinkage of −0.50% to +0.50% according to the standard test method of ASTM D 885 (specimen size: weft yarn direction length 60 cm×width 1 cm, 177° C., 2 minutes, load of 0.05 g/de based on weft yarn).

5. The rubber reinforcing material according to claim 1, wherein the adhesive layer comprises resorcinol-formaldehyde-latex (RFL).

6. The rubber reinforcing material according to claim 1, wherein the rubber compound layer comprises one or more elastic polymers selected from the group consisting of natural rubber and synthetic rubber.

7. The rubber reinforcing material according to claim 1, wherein the rubber compound layer has a thickness of 5 μm to 200 μm.

8. A tire comprising the rubber reinforcing material according to claim 1.

9. The tire according to claim 8, wherein the rubber reinforcing material is applied in at least one of a cap ply, a belt, and a carcass.

* * * * *